United States Patent
Arslan

(10) Patent No.: US 12,177,670 B2
(45) Date of Patent: Dec. 24, 2024

(54) MAN IN THE MIDDLE ATTACK DETECTION IN BLE HIGH ACCURACY DISTANCE MEASUREMENT

(71) Applicant: Silicon Laboratories Inc., Austin, TX (US)

(72) Inventor: Guner Arslan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 351 days.

(21) Appl. No.: 17/887,847

(22) Filed: Aug. 15, 2022

(65) Prior Publication Data

US 2024/0056818 A1 Feb. 15, 2024

(51) Int. Cl.
*H04W 12/122* (2021.01)
*H04B 1/00* (2006.01)
*H04W 12/79* (2021.01)

(52) U.S. Cl.
CPC .......... *H04W 12/122* (2021.01); *H04B 1/001* (2013.01); *H04W 12/79* (2021.01)

(58) Field of Classification Search
CPC ..... H04W 12/122; H04W 12/79; H04B 1/001
See application file for complete search history.

(56) References Cited

U.S. PATENT DOCUMENTS

| | | | |
|---|---|---|---|
| 2020/0120509 A1* | 4/2020 | Stitt | G01S 13/765 |
| 2023/0039434 A1* | 2/2023 | Ohashi | G01S 13/08 |
| 2023/0051782 A1* | 2/2023 | Ohashi | G01S 5/14 |
| 2023/0129726 A1* | 4/2023 | Narula | G01S 5/0284 |
| | | | 342/458 |
| 2023/0138363 A1* | 5/2023 | Ohashi | G01S 5/0036 |
| | | | 455/456.1 |
| 2024/0053432 A1* | 2/2024 | Arslan | G01S 7/006 |

* cited by examiner

*Primary Examiner* — Kenneth T Lam
(74) *Attorney, Agent, or Firm* — NIELDS, LEMACK & FRAME, LLC

(57) ABSTRACT

A system that is capable of detecting a Man in the Middle attack is disclosed. The system includes a receive circuit for receiving incoming packets. The system also includes a digitized model of at least part of the receive circuit and optionally part of the transmit circuit. The system compares the output from the digitized model with the output from the read circuit to determine the likelihood of a Man in the Middle Attack. In certain embodiments, the digitized model is a finite impulse response filter with multiple taps. The system correctly identifies Man in the Middle attacks more than 90% of the time when the signal to noise ratio is greater than 20 dB.

19 Claims, 13 Drawing Sheets

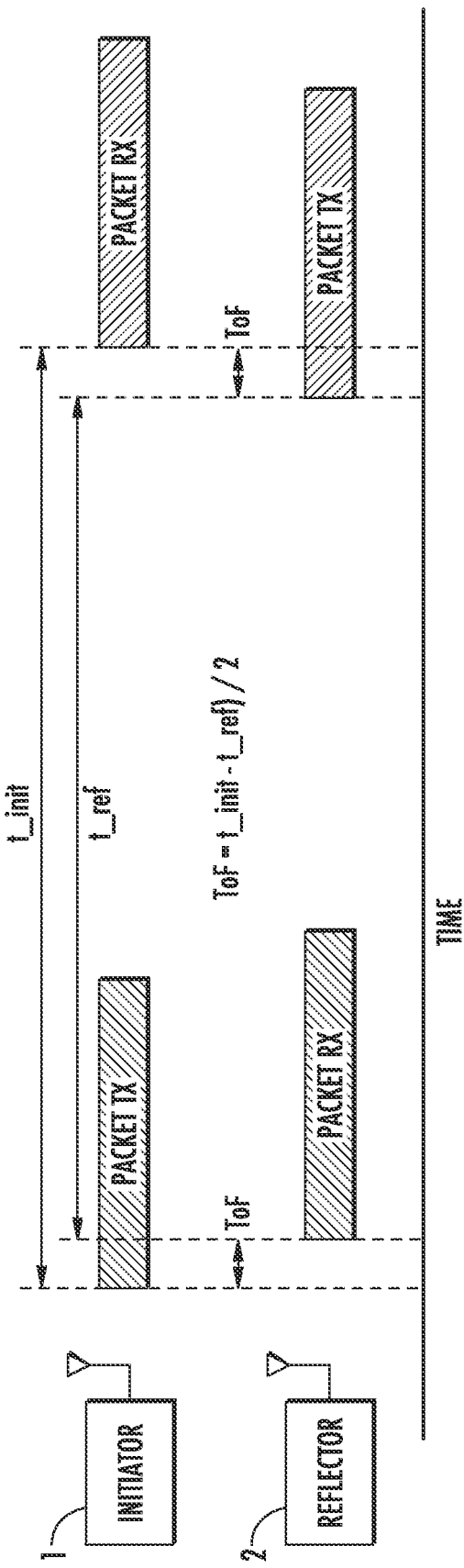

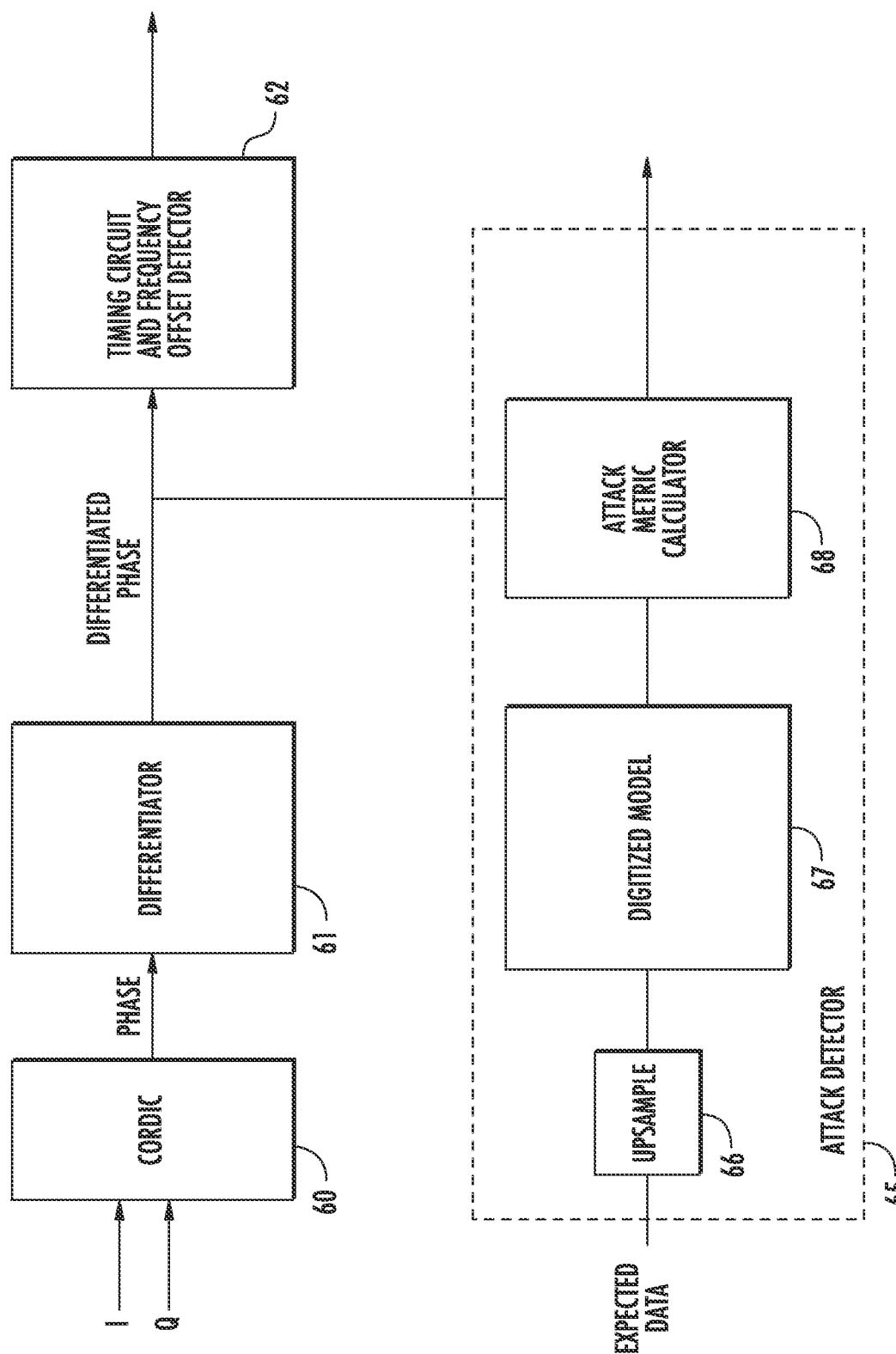

MAN IN THE MIDDLE ATTACK DETECTION IN BLE HIGH ACCURACY DISTANCE MEASUREMENT

FIELD

This disclosure describes systems and methods for detecting man in the middle attacks during BLE high accuracy distance measurements.

BACKGROUND

Bluetooth Low Energy (BLE) is becoming a ubiquitous network protocol, being used for speakers, headphones, printers, and other devices. High accuracy distance measuring (HADM) has become a key feature of BLE. HADM allows a network device to determine the distance from that network device to another network device with high accuracy. This may be useful in spatial positioning applications and also useful for keyless entry in automobiles, through the use of FOB keys.

One method that may be used to measuring distance in HADM is based on round trip delay.

FIG. 1A shows the operation of HADM. The horizontal axis represents time. The system includes an initiator 1 and a reflector 2. The initiator 1 transmits a packet to the reflector 2. The initiator 1 starts a timer at the moment that the first bit of the packet reaches the transmit antenna. Some time after the initiator 1 starts transmitting, the reflector 2 begins receiving this packet. The difference between the start of transmission by the initiator 1 and the start of reception by the reflector 2 is the time of flight (ToF). As soon as this packet is detected by the reflector 2, the reflector 2 starts a timer. The reflector 2 then waits a predetermined amount of time and then transmits a packet back to the initiator 1. The reflector 2 stops its timer when the first bit of its packet reaches its transmit antenna. This time is referred to as the reflector time or t ref in FIG. 1A. When the initiator 1 senses the incoming packet from the reflector 2, the initiator 1 stops its timer. This total time is referred to as initiator time or t_init in FIG. 1A. Note that both timers are compensated for delays through the respective read and transmit circuits. If the reflector time is subtracted from the initiator time and that difference is divided in half, the time of flight can be determined.

Round trip delay may be measured using two different standard defined signals; Sounding Sequence and Random Bit Sequence. The Sounding Sequence is a predetermined bit pattern having a predetermined frequency. This approach yields more accurate estimates of distance, but is more prone to a Man in the Middle attack, where an attacker intercepts packets and manipulates those packets so that the distance measured appears closer than it actually is. This could be problematic, for example, by allowing the attacker to make a car FOB key appear closer to the car than it actually is and permitting entry into the vehicle.

FIG. 1B shows a situation where a Man in the Middle attack occurs. In this figure, the initiator 1 has sent a packet to the reflector 2 and awaits the response. At this time, the attacker 3 has been monitoring the communications and is aware that the reflector 2 is transmitting a packet back to the initiator 1. Note that while this describes the attacker 3 as manipulating the packet from the reflector 2 to the initiator 1, it is understood that the attacker 3 may manipulate packets sent from the initiator 1 to the reflector as well. When the reflector 2 begins transmitting, the attacker detects this signal, and using a high bandwidth high speed analog to digital converter (ADC) 4, an attack modem 5 and a high bandwidth high speed digital to analog converter (DAC) 6, transmits a stronger signal back to the initiator 1. In order for the initiator 1 to be deceived into believing that the reflector 2 is closer than it actually is, the attacker must transmit the bits from the reflector's packet before it receives them from the reflector 2. In other words, the attacker 3 must predict the next bit, and begin transmitting that bit, before it is actually received. If the attacker 3 incorrectly predicted that bit, it quickly corrects by inverting the phase. FIG. 1C shows this operation of the attacker 3. Line 7 represents the signal transmitted by the attacker 3, while line 8 shows the actual bits transmitted by the reflector 2. Note that there are phase distortions in line 7, which represent corrections made by the attacker 3. Importantly, if the attacker 3 is able to react quickly enough, the initiator 1 may not be any errors in the expected bit pattern from the reflector 2.

However, as can be seen in FIG. 1C, there are clearly differences in the shape of the waveform from the reflector (line 8) and the shape of the waveform from the attacker (line 7). Thus, it would be beneficial if there were a system that was able to detect a Man in the Middle attack by observing the difference between the expected waveform and the received waveform. Further, it would be advantageous if that system did not require the complete duplication of the transmit and receive circuits.

SUMMARY

A system that is capable of detecting a Man in the Middle attack is disclosed. The system includes a receive circuit for receiving incoming packets. The system also includes a digitized model of at least part of the receive circuit and optionally part of the transmit circuit. The system compares the output from the digitized model with the output from the read circuit to determine the likelihood of a Man in the Middle Attack. In certain embodiments, the digitized model is a finite impulse response filter with multiple taps. The system correctly identifies Man in the Middle attacks more than 90% of the time when the signal to noise ratio is greater than 20 dB.

According to one embodiment, a wireless network device is disclosed. The wireless network device comprises a processing unit; a transmit circuit; a receive circuit comprising: an RF circuit to generate incoming data, wherein the RF circuit comprises front end components and a channel filter having a first bandwidth; a phase calculator to generate a phase for each sample of the incoming data that was processed by the channel filter; a second channel path, wherein the second channel path generates a second channel path output, wherein the second channel path output is a plurality of phase values or a plurality of differentiated phase values, the second channel path comprising: a second channel filter, having a second bandwidth different from the first bandwidth, in communication with the front end components; and a second phase calculator, to generate a phase for each sample output from the second channel filter to create the plurality of phase values; a fractional delay filter to create a delayed second channel path output; and an attack detector circuit, wherein the attack detector circuit comprises: a digitized model of at least part of the second channel path operating at a same oversample rate as the receive circuit; and an attack metric calculator, wherein the attack metric calculator compares an output of the digitized model with the second channel path output and computes a correlation score. In some embodiments, the digitized model comprises a finite impulse response (FIR) filter model having a plurality of taps. In some embodiments, the digitized model emulates an operation of the front end components, the second channel filter, and the second phase calculator. In some embodiments, the second channel path further comprises a differentiator to generate the plurality of differentiated phase values from the plurality of phase values and the second channel path output comprises the plurality of differentiated phase values and the digitized model emulates an operation of the front end components, the second channel filter, the second phase calculator and the differentiator. In some embodiments, the transmit circuit comprises a shaping function and a power amplifier; and the attack detector circuit comprises a second digitized model to emulate at least a portion of the transmit circuit, wherein an output of the second digitized model is used as an input to the digitized model. In some embodiments, the second digitized model operates at a different oversample rate than the transmit circuit. In some embodiments, the second digitized model operates at a same oversample rate as the transmit circuit, and the attack detector circuit comprises a resampling circuit disposed between the second digitized model and the digitized model. In some embodiments, the transmit circuit comprises a shaping function and a power amplifier; and the digitized model emulates at least a portion of the transmit circuit. In some embodiments, the correlation score is used to determine whether a distance measurement should be discarded.

According to another embodiment, a wireless network device is disclosed. The wireless network device comprises a processing unit; a transmit circuit; a receive circuit comprising: an RF circuit to generate incoming data, wherein the RF circuit comprises front end components and a channel filter having a first bandwidth; a phase calculator to generate a phase for each sample of the incoming data that was processed by the channel filter; and a second channel path, wherein the second channel path generates a second channel path output, wherein the second channel path output is a plurality of phase values or a plurality of differentiated phase values, the second channel path comprising: a second channel filter, having a second bandwidth different from the first bandwidth, in communication with the front end components; and a second phase calculator, to generate a phase for each sample output from the second channel filter to create the plurality of phase values; and an attack detector circuit, wherein the attack detector circuit comprises: a digitized model of at least part of the second channel path, wherein the digitized model operates using a higher oversample rate than the second channel path; and an attack metric calculator, wherein the attack metric calculator compares an output of the digitized model with the second channel path output and computes a correlation score. In some embodiments, there are N samples from the digitized model for each output from the second channel path, and the attack metric calculator compares each of the N samples to the second channel path output and generates N scores, wherein a score of the N scores having a best correlation is selected as the correlation score. In some embodiments, the digitized model comprises a finite impulse response (FIR) filter model having a plurality of taps. In some embodiments, the digitized model emulates an operation of the front end components, the second channel filter, and the phase calculator. In some embodiments, the second channel path further comprises a differentiator to generate the plurality of differentiated phase values from the plurality of phase values and the second channel path output comprises the plurality of differentiated phase values and the digitized model emulates an operation of the front end components, the second channel filter, the phase calculator and the differentiator. In some embodiments, the transmit circuit comprises a shaping function and a power amplifier; and the attack detector circuit comprises a second digitized model to emulate at least a portion of the transmit circuit, wherein an output of the second digitized model is used as an input to the digitized model. In some embodiments, the second digitized model operates at a different oversample rate than the transmit circuit. In some embodiments, the second digitized model operates at a same oversample rate as the transmit circuit, and the attack detector circuit comprises a resampling circuit disposed between the second digitized model and the digitized model. In some embodiments, the transmit circuit comprises a shaping function and a power amplifier; and the digitized model emulates at least a portion of the transmit circuit. In some embodiments, the correlation score is used to determine whether a distance measurement should be discarded.

BRIEF DESCRIPTION OF THE DRAWINGS

For a better understanding of the present disclosure, reference is made to the accompanying drawings, in which like elements are referenced with like numerals, and in which:

FIG. 1A shows how distance using HADM is calculated;

FIGS. 4A-4E show block diagrams of the receive circuit and the attack detector circuit according to three embodiments;

DETAILED DESCRIPTION

As described above, a successful Man in the Middle attack relies on the ability for the attacker to deceive the initiator 1 into believing that the received packet was transmitted by the reflector 2. The present system compares the actual received packet to an internally generated version of that packet to detect differences that may indicate that a Man in the Middle attack is underway.

Figure 1B:
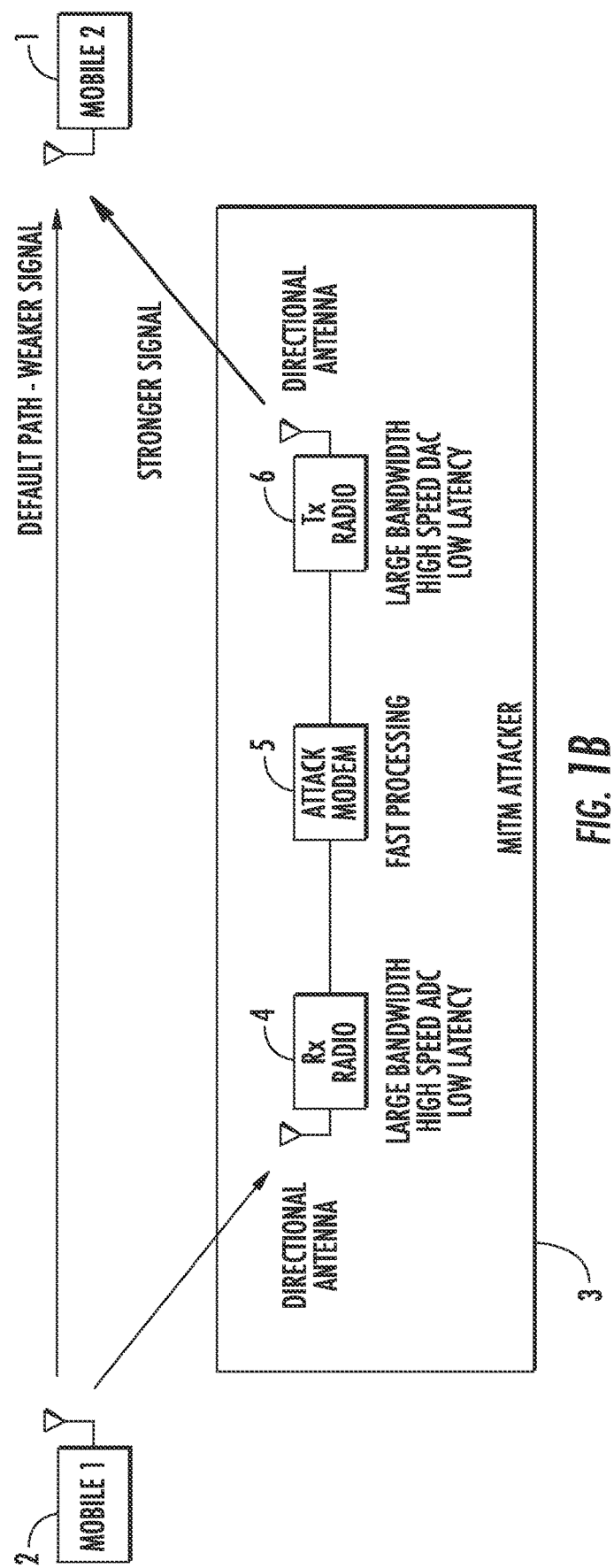
FIG. 1B shows a Man in the Middle attack.
Figure 1C:
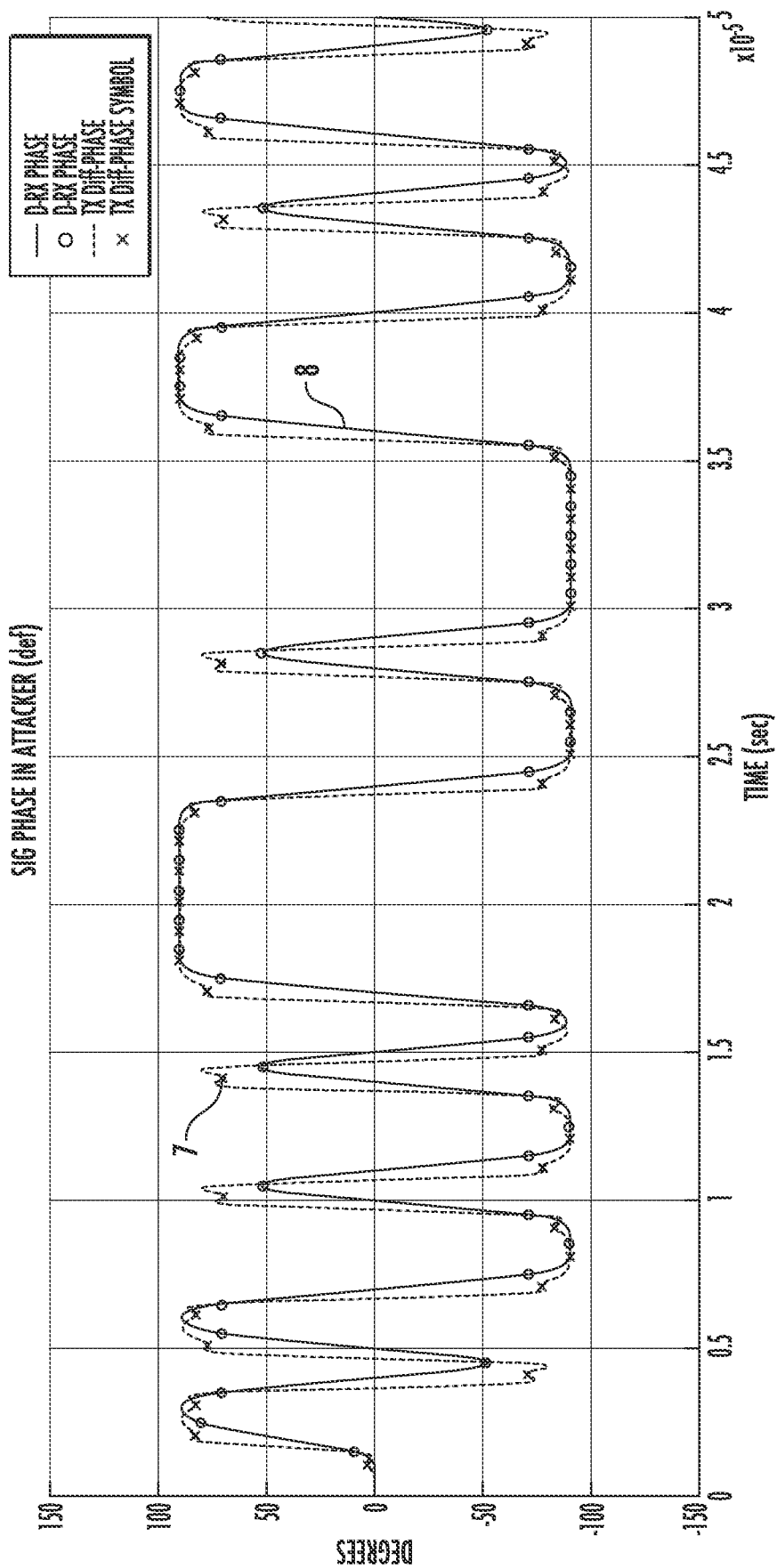
FIG. 1C shows the signal from the reflector and the transmitted signal from the attacker.
Figure 2:
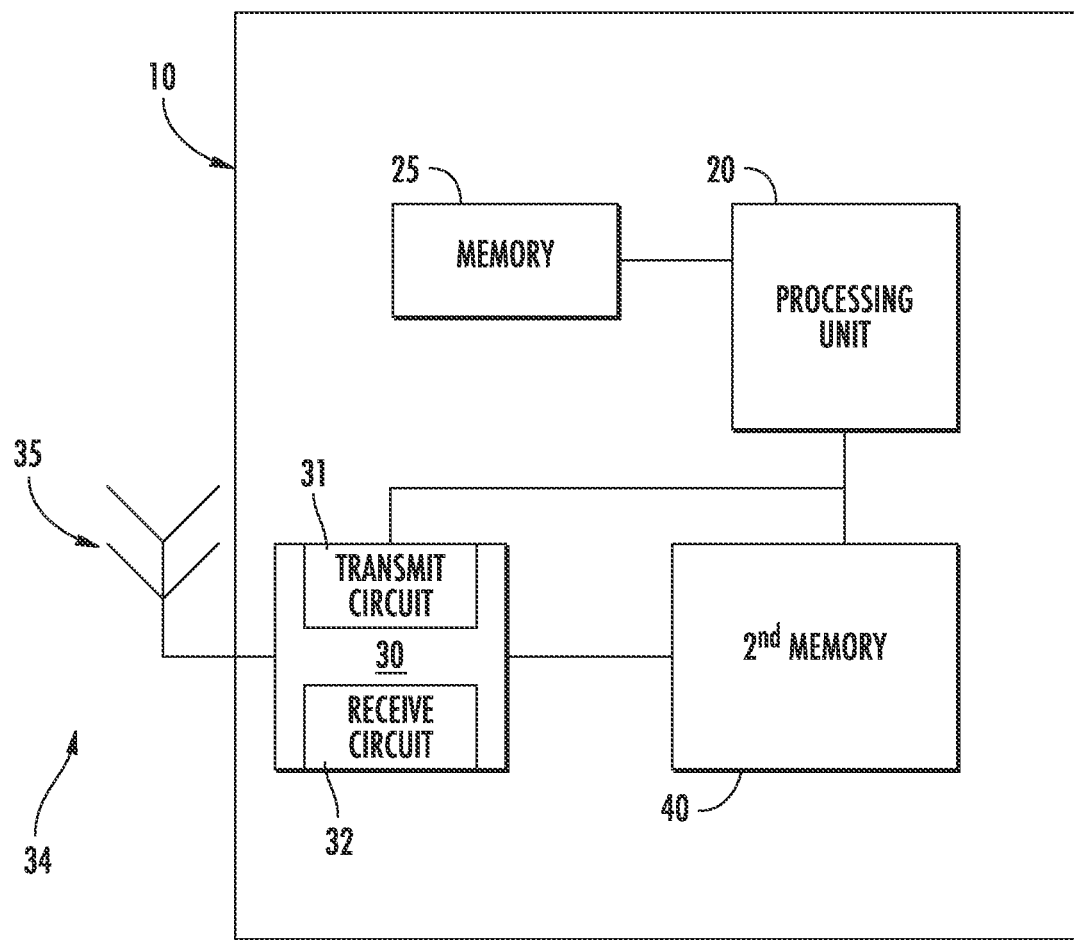
FIG. 2 shows a block diagram of a wireless network device.

FIG. 2 shows a block diagram of a representative network device 10 that implements an Attack Detector circuit to detect Man in the Middle attacks according to one embodiment.

The network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 also includes a network interface 30, which may be a wireless interface that connects with an antenna 35. The network interface 30 may support any wireless network, such as Bluetooth, Wi-Fi, networks utilizing the IEEE 802.15.4 specification, such as Zigbee and Wi-SUN, networks utilizing the IEEE 802.15.6 specification, and wireless smart home protocols, such as Z-Wave. Further, the network interface 30 may also support a proprietary or custom wireless network. The network interface 30 includes a transmit circuit 31 which is used to transmit data from this network device 10 using the antenna 35. The network interface 30 also includes a receive circuit 32 which is used to receive packets.

The network device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the wireless network 34. Although not shown, the network device 10 also has a power supply, which may be a battery or a connection to a permanent power source, such as a wall outlet.

While the processing unit 20, the memory device 25, the network interface 30, and the second memory device 40 are shown in FIG. 2 as separate components, it is understood that some or all of these components may be integrated into a single electronic component. Rather, FIG. 2 is used to illustrate the functionality of the network device 10, not its physical configuration.

Figure 3:
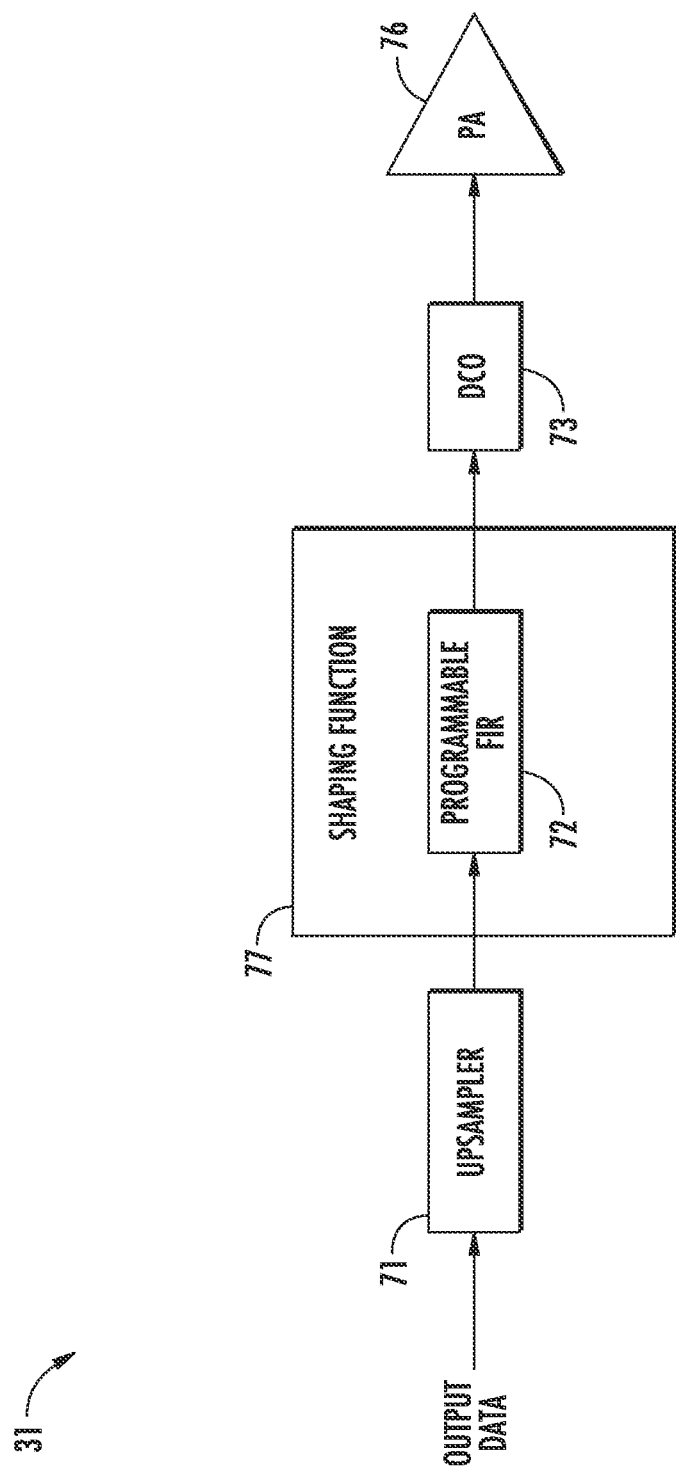
FIG. 3 shows a block diagram of the transmit circuit.

FIG. 3 shows a detailed illustration of the transmit circuit 31. The data to be output by the transmitting device enters an upsampler 71, which is used to upsample the waveforms. In this disclosure, the terms "upsample" and "oversample" may be used interchangeably. In certain embodiments, the incoming data may be upsampled by a factor of 8. Following the upsampler 71 is the Finite Impulse Response (FIR) filter 72. The FIR filter 72 is programmable and may be configured to generate a Guassian shaped or raised cosine shaped output using the incoming upsampled data. Of course, the upsampled data may be shaped differently if desired. Following the FIR filter 72 may be a digitally controlled oscillator (DCO) 73. The output of the FIR filter 72 is used to control the frequency of the DCO 73, allowing the creation of the output signal. This output signal then enters the power amplifier (PA) 76, which is transmitted by antenna 35. Certain components within the transmit circuit 31, such as the FIR filter 72 serve to shape the signal that is transmitted, and may be referred to as the shaping function 77.

Figure 4A:
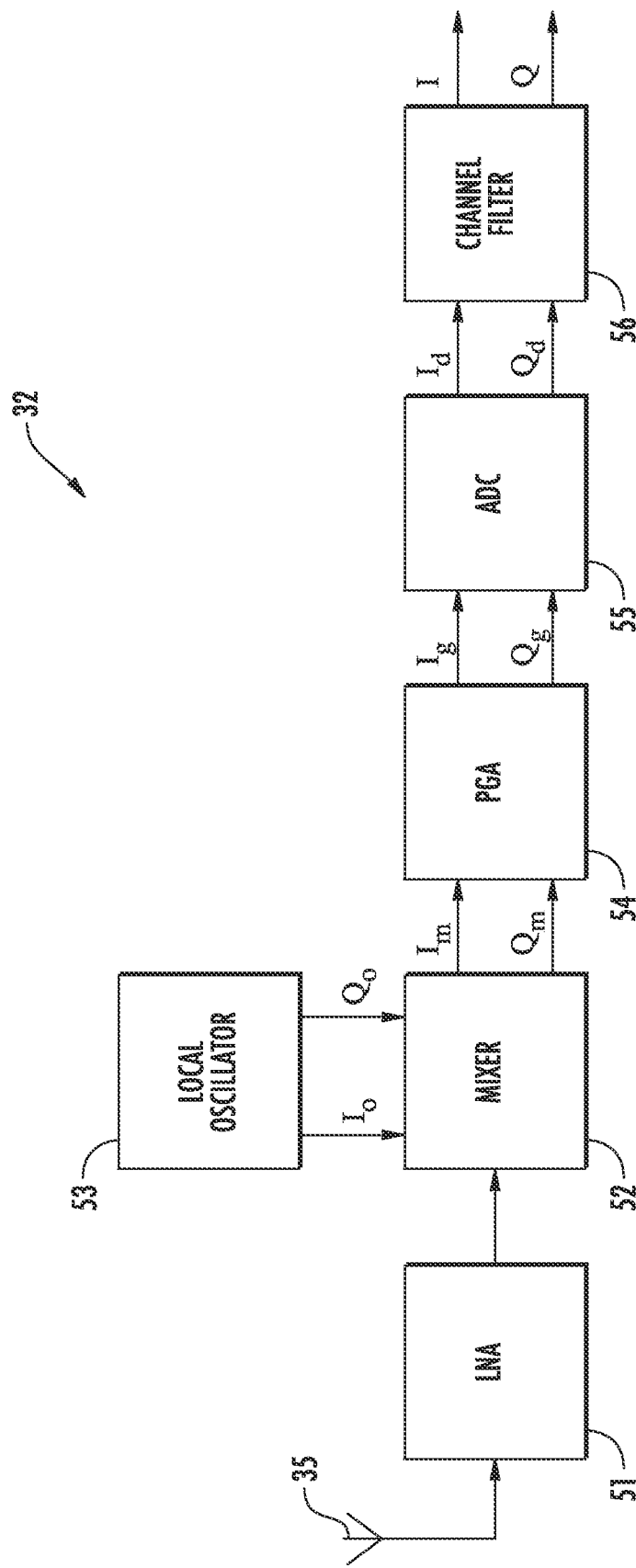
Figure 4B:
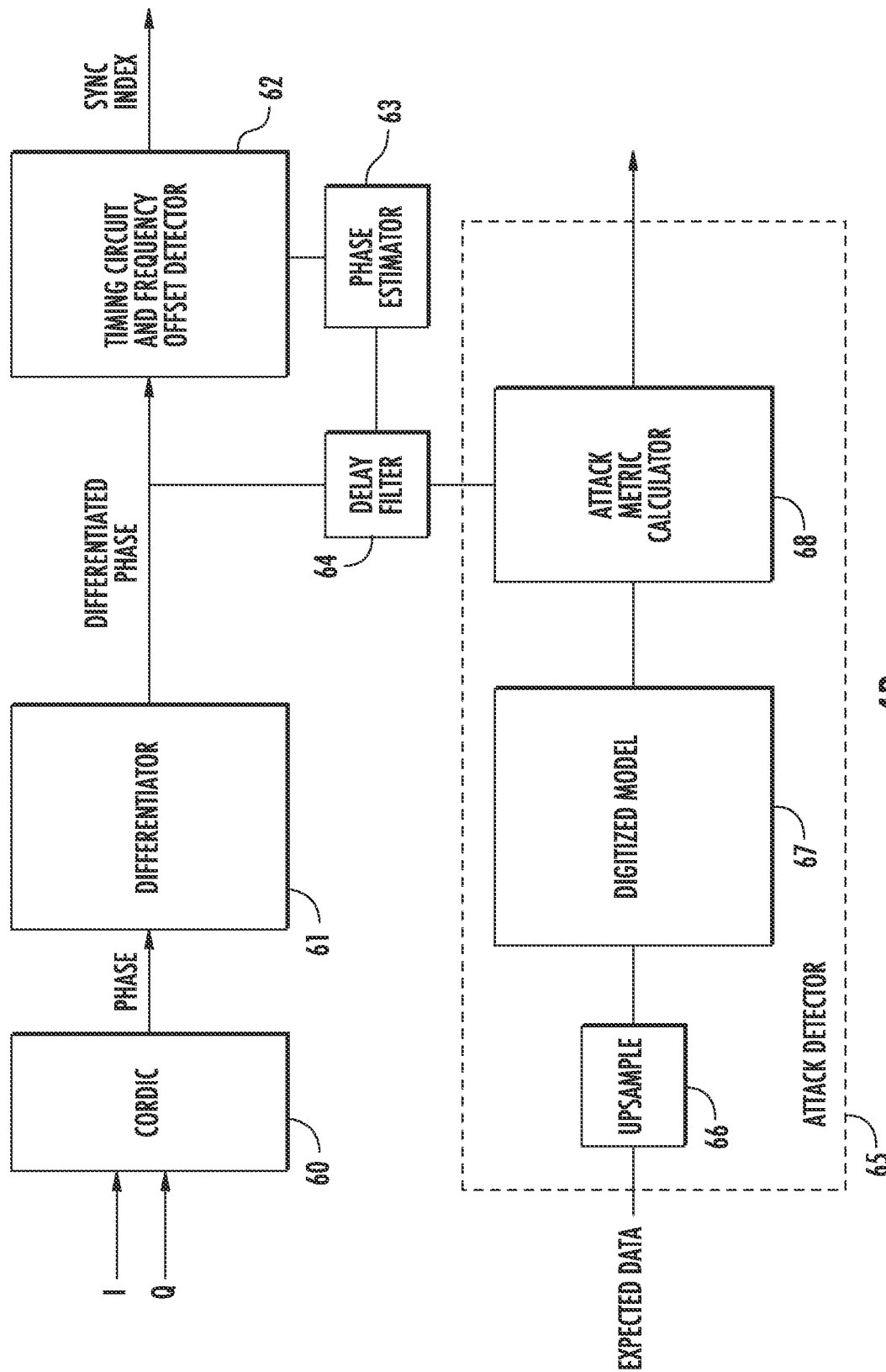
Figure 4C:
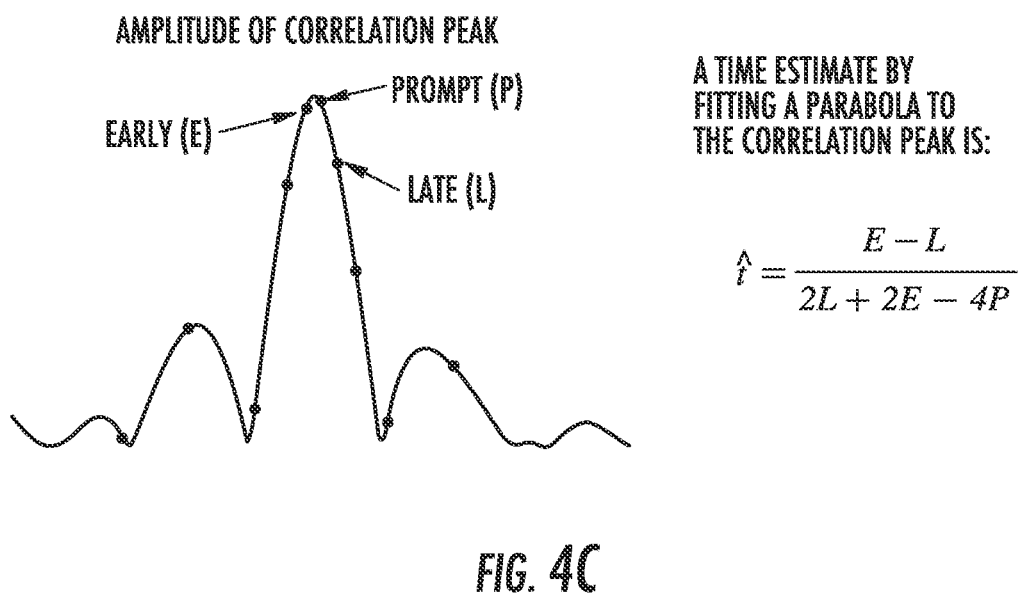
Figure 4E:
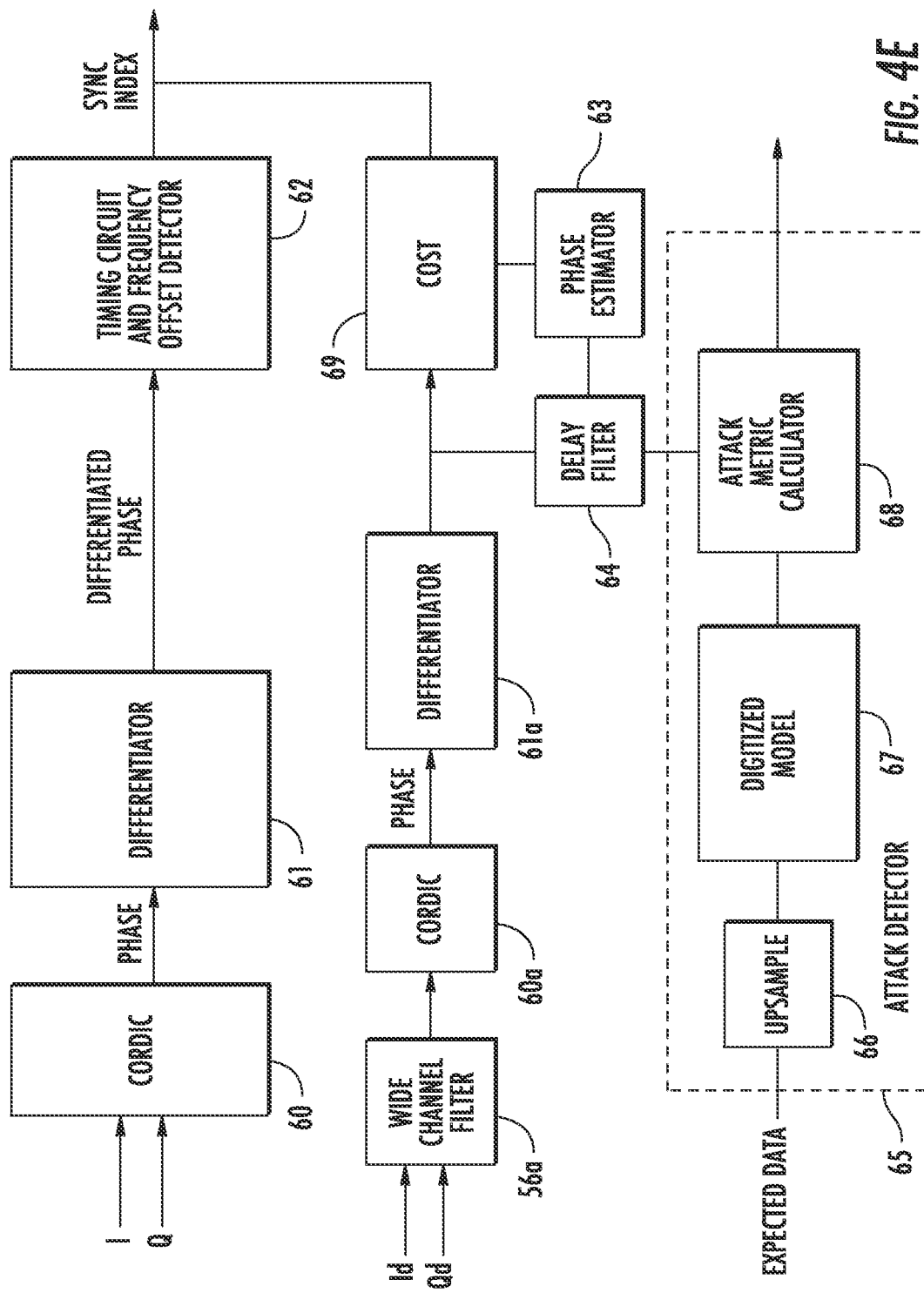

FIG. 4A-4E provide a more detailed illustration of the receive circuit 32 of the network interface 30 according to three different embodiments. FIGS. 4A-4C represent a first embodiment, FIGS. 4A and 4D represent a second embodiment, and FIGS. 4A and 4E represent a third embodiment. As shown in FIG. 4A, the wireless signals first enter the network interface 30 through the antenna 35. The antenna 35 is in electrical communication with a low noise amplifier (LNA) 51. The LNA 51 receives a very weak signal from the antenna 35 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sine of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52, are then fed into programmable gain amplifier (PGA) 54. The PGA 54 amplifies the $I_m$ and $Q_m$ signals by a programmable amount. These amplified signals may be referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may then pass through a channel filter 56. The filtered signals are referred to as I and Q. The output of the channel filter 56 may be referred to as the baseband signals. The components that are used to receive the signal from the antenna 35 and produce the baseband signals are referred to as the RF circuit.

These I and Q signals can be used to recreate the amplitude and phase of the original signal. In certain embodiments, the I and Q values may be considered complex numbers, wherein the I value is the real component and the Q value is the imaginary component.

As shown in FIG. 4B, the I and Q signals then enter a phase calculator, such as a CORDIC (Coordination Rotation Digital Computer) 60, which determines the amplitude and phase of the signals. Amplitude is given as the square root of $I^2$ and $Q^2$, while phase is given by the $\tan^{-1}$ (Q/I). In some embodiments, the CORDIC 60 may be a hardware component disposed in the network interface 30. In other embodiments, the CORDIC may be implemented in software. In other embodiments, a different type of phase calculator may be used.

The phase output from the CORDIC 60 is then supplied as an input to the differentiator 61. As is well known, the derivative of phase is frequency. Thus, by subtracting the values of two phase values, and optionally dividing the difference by a time duration, a value that is indicative of frequency can be determined. In some embodiments, the differentiator 61 may be a hardware component disposed in the network interface 30. In other embodiments, the differentiator 61 may be implemented in software. The differentiated phase signal may be a signed value, such as an 8-, 16- or 32-bit signed value.

In some embodiments, additional components, which are not shown may also be included in the path from the antenna 35 to the differentiator 61.

The differentiated phase signal is used as an input to a Timing Circuit and Frequency Offset Detector 62. The Timing Circuit and Frequency Offset Detector 62 may have two functions. First, it determines the frequency offset (if any) between the incoming data stream and the sample clock used by the network device 10. Second, it detects the synchronization pattern so that the incoming data stream can be correctly aligned to byte boundaries.

One approach to calculating frequency offset is to average the values of the data samples for all of the bits in the preamble. As noted above, the preamble is a sequence of alternating 1s and 0s. A bit having a value of 1 is typically transmitted at a first frequency, such as $F_c+F_d$, where $F_c$ is the carrier frequency and $F_d$ is the modulation frequency. A bit having the value of 0 is typically transmitted at a second frequency, such as $F_c-F_d$. Further, the carrier frequency is typically removed before the data bits are processed. Therefore, the preamble should appear as a sequence of data samples having alternating values of $F_d$ and $-F_d$, the sum of which should ideally be 0. However, if there is a frequency offset between the transmitting device and this network device, each of these values will be changed. In other words, the sequence of data bits will have alternating values of $F_o+F_d$ and $F_o-F_d$. Averaging all of the bits in the preamble will result in a value of $F_o$, which can then be subtracted from all of the incoming data bits to remove the frequency offset.

This frequency offset can then be removed from the data samples before further processing. In one embodiment, a subtraction circuit is provided after the differentiator 61, which subtracts the frequency offset before the data samples are used by the rest of the network device. In another embodiment, a digital mixer may be disposed before the channel filter to remove the IF frequency. The frequency offset can be removed using this digital mixer. Other techniques may be used to remove the frequency offset and the disclosure is not limited to any particular technique.

The other function of the Timing Circuit and Frequency Offset Detector 62 is to identify the synchronization pattern. This can be done by creating a cost function where a sequence of data samples is compared to the known synchronization pattern. The point at which this cost function is minimized is identified as the synchronization pattern. The rest of the receive circuit can then use this indication to properly align the incoming bits into bytes. Of course, other mechanisms may be used to identify the synchronization pattern.

An attack detector circuit 65 operates in conjunction with the receive circuit 32. In both embodiments, the attack detector circuit 65 receives, as an input, data that is representative of the data that the other device is to transmit. In some embodiments, this is the output data that is provided to the upsampler 71 in the transmit circuit 31. In other embodiments, the data may be related to a different output of the transmit circuit 31. The attack detector circuit 65 also receives an input based on the differentiated phase. Using these two inputs, the attack detector circuit 65 determines the likelihood of a Man in the Middle Attack.

In this particular embodiment shown in FIGS. 4B-4C, the attack detector circuit 65 receives a delayed version of the differentiated phase. Specifically, when the incoming signal is received from the transmitting device, it may not be aligned with the internal clock of the network device 10. In other words, the center of an incoming bit may not be aligned with the clock edge of the internal clock. Thus, in this embodiment, the differentiated phase signal is delayed to align the incoming data bits with the internal clock. This is performed using a phase estimator 63 and a fractional delay filter 64.

FIG. 4C shows the operation of the phase estimator 63 according to one embodiment. In this embodiment, three consecutive points are selected; an early point (E), a prompt point (P) and a late point (L). Further, P must be greater than E and L. These three points may be fit to a parabola to determine the time when the actual peak occurs. The value $\hat{t}$ represents the difference in time between the edge of the internal clock and the peak of the incoming signal. Once this difference in time has been calculated, the differentiated phase signal may be delayed by the fractional delay filter 64 so that the differentiated phase signal that is received by the attack detector circuit 65 is aligned with the internal clock. In this way, sample points are at the peak of the parabola.

Returning to FIG. 4B, the attack detector circuit 65 includes an upsample circuit 66 to create a plurality of samples from each incoming sample of the expected data. In certain embodiments, the oversampling rate is the same as is used by the receive circuit 32.

The upsampled expected data is then input to a digitized model 67. This digitized model may be a finite impulse response filter that emulates the behavior of all of the components in the transmit circuit 31 of the transmitting device to the output of the differentiator 61 in the receiving device. In yet another embodiment, the digitized model 67 may comprise two separate FIR filters. Specifically, the FIR filter 72 of the transmit circuit 31 may be included in the digitized model 67, along with a second FIR filter that emulates the behavior of the components in the transmit circuit 31 after the FIR filter 72 and the components in the receive circuit 32.

The output of the digitized model 67 is then input to the attack metric calculator 68. The attack metric calculator 68 compares the output of the digitized model 67 with the delayed differentiated phase from the fractional delay filter 64. The operation of the attack metric calculator 68 is described in more detail below.

Thus, in this embodiment, the attack detector circuit 65 receives the expected data, oversampled to the same frequency as is used by the receive circuit 32, and provides the expected output using a digitized model 67 that emulates the operation of at least a portion of the receive circuit 32 and optionally at least a portion of the transmit circuit 31. In some embodiments, the digitized model emulates the operation of the RF circuit, the CORDIC 60 and the differentiator 61. That expected output is then compared to a delayed version of the differentiated phase and a score is generated.

FIGS. 4A and 4D show a second embodiment of the receive circuit 32. In this embodiment, the LNA 51, Mixer 52, local oscillator 53, the PGA 54, the ADC 55, the channel filter 56, the CORDIC 60, the differentiator 61 and the timing circuit and frequency offset detector 62 are as described above.

The attack detector circuit 65 in this embodiment has a digitized model 67 and an attack metric calculator 68 as described above. However, in this embodiment, the upsample circuit 66 operates at a higher oversample rate than the receive circuit 32. In one embodiment, the upsample circuit 66 operates at twice the oversample rate as the receive circuit 32. In this way, there are multiple samples from the digitized model 67 for each differentiated phase from the receive circuit 32. Therefore, in this embodiment, the phase estimator 63 and fractional delay filter 64 are not used.

Thus, in this embodiment, the attack detector circuit 65 receives the expected data, oversampled to a higher frequency than is used by the receive circuit 32, and provides the expected output using a digitized model 67 that emulates the operation of at least a portion of the receive circuit 32 and optionally at least a portion of the transmit circuit 31. In some embodiments, the upsample circuit 66 creates N times more samples than the receive circuit 32. In this embodiment, the attack metric calculator 68 generates N different scores; where each score utilizes a specific upsampled bit. For example, assume that the upsample circuit 66 generates 2 times as many samples as the receive circuit 32. In this embodiment, two scores will be generated; one that correlates the odd numbered samples from the digitized model 67 to the output of the receive circuit 32; and a second that correlates the even numbered samples from the digitized model 67 to the output of the receive circuit 32. In some embodiments, the digitized model emulates the operation of the RF circuit, the CORDIC 60 and the differentiator 61. That expected output is then compared to the differentiated phase and a score is generated.

In certain embodiments, the bandwidth of the channel filter 56 may be sufficiently narrow such that glitches that are generated by the bad actor are filtered and cannot be detected. Alternatively, the bandwidth of the channel filter may be very large and a narrower bandwidth is needed for glitch detection. In such situations, it may be beneficial to replicate part of the receive circuit 32. Specifically, FIGS. 4A and 4E show another embodiment. In this embodiment, the input to the channel filter 56 (see FIG. 4A) is also provided to the second channel filter 56a (see FIG. 4E). The components between the antenna 35 and the channel filter 56 may be referred to as the front end components. The second channel filter 56a may be similar in design to that shown in FIG. 4A, but may have a different bandwidth so that glitches in the incoming signal are retained. The bandwidth of the second channel filter 56a may be greater than that of the channel filter 56. In other embodiments, the bandwidth of the second channel filter 56a may be narrower than that of the channel filter 56. Since the output of the second channel filter 56a may differ from the output of the channel filter 56, the CORDIC 60 (or other phase calculator) and differentiator 61 are also replicated. These components operate in the same manner as those in FIGS. 4B and 4D. The combination of components that are duplicated, beginning with the second channel filter 56a, may be referred to as a second channel path. While some components are shown in FIG. 4E, it is understood that other components, such as mixers, filters and others, may also be part of the second channel path. The output from the second channel path, which may be a plurality of phase values or a plurality of differentiated phase values, is referred to as the second channel path output.

In this embodiment, the timing circuit and frequency offset detector 62 may be duplicated. In an alternative embodiment, these circuits are not duplicated but there may be a need for a cost function 69. The cost function 69 is used to account for the phase delay between the differentiated phase used by the timing circuit and frequency offset detector 62 and the differentiated phase generated in the second channel path. The output from the cost function 69 is used as the input to the phase estimator 63, which provides the necessary delay to the fractional delay filter 64. Thus, in this embodiment, the output of the fractional delay filter 64 is a delayed second channel path output.

In this embodiment, the digitized model 67 is designed to emulate the operation of the second channel path and optionally a portion of the transmit circuit 31. The attack detector circuit 65 compares the output of the digitized model to the second channel path output. It is noted that while FIG. 4E shows a phase estimator 63 and a fractional delay filter 64, it is understood that the second channel path may also be used with the upsample circuit described in FIG. 4D. In this embodiment, the fractional delay filter 64 and phase estimator 63 may be omitted and the digitized model may operate at an oversample rate that is greater than that used by the second channel path.

Figure 5A:
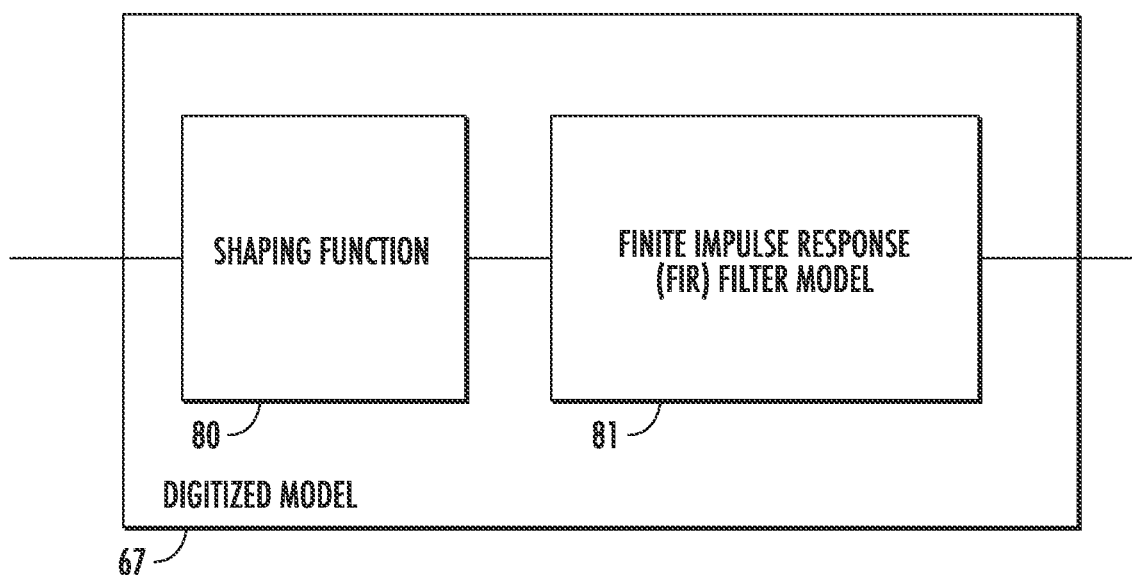
FIG. 5A shows the digitized model of the attack detector circuit according to one embodiment.

FIG. 5A shows one embodiment of the Digitized Model 67. In one embodiment, the shaping function 80 may be identical to the shaping function 77 of the transmit circuit 31. In another embodiment, the shaping function 80 may perform the same function as the shaping function 77, but may utilize a different oversample rate. For example, the upsampler 71 in the transmit circuit 31 may utilize a different oversample rate than the upsample circuit 66 in the attack detector circuit 65. As an example, the shaping function 80 in the attack detector circuit 65 may utilize a upsampled signal that is 4 times or 5 times the incoming data to match the sampling rate of the receive circuit 32, while the shaping function 77 in the transmit circuit 31 may operate on data that is oversampled by a different factor, such as a factor of 8.

At noted above, the shaping function 80 may emulate the function of the FIR filter 72 from the transmit circuit 31. The output from the shaping function 80 is then used as the input to a finite impulse response (FIR) filter model 81. By utilizing a separate FIR filter for the shaping function 80, the number of taps needed for the FIR filter model 81 may be reduced. This FIR filter model 81 may be a Wiener model. In this embodiment, a FIR filter model 81 is a multitap filter wherein the coefficients are configured to minimize the difference between the differentiated phase and the output of the FIR filter model 81. The expected data is referred to as w[n] and the output from the differentiated phase is referred to as s[n]. The FIR filter model 81 has a plurality of coefficients, one associated with each of its taps. The coefficients of the FIR filter model 81 may be determined using the Wiener-Hopf equations:

$$R_w a = r_{ws};$$

where $R_w$ is the auto-correlation matrix of w[n];
$R_{ws}$ is the cross-correlation vector of w[n] and s[n]; and
A is the vector of FIR filter coefficients.

In one embodiment, the incoming data is upsampled by an oversample rate (OSR) of 4 or 5. In this embodiment, the number of taps on the FIR filter model may be 2B+OSR, where OSR is the number of samples in each bit and B is the number of samples from the previous bit and the next bit that are also used to determine the value of a particular sample. For example, the OSR may be 5 and the FIR filter model 81 may utilize three samples from the previous bit and three samples from the next bit. In this embodiment, the FIR filter model 81 may have 11 taps. In other embodiments, the FIR filter model 81 may use 7, 9, 13 or 15 taps when the OSR is 5. If the OSR is 4, the FIR filter model 81 may use 6, 8, 10 and 12 taps. Thus, in some embodiments, the number of taps on the FIR filter model is greater than the number of samples per bit. In other words, the number of taps is greater than OSR.

Figure 5B:
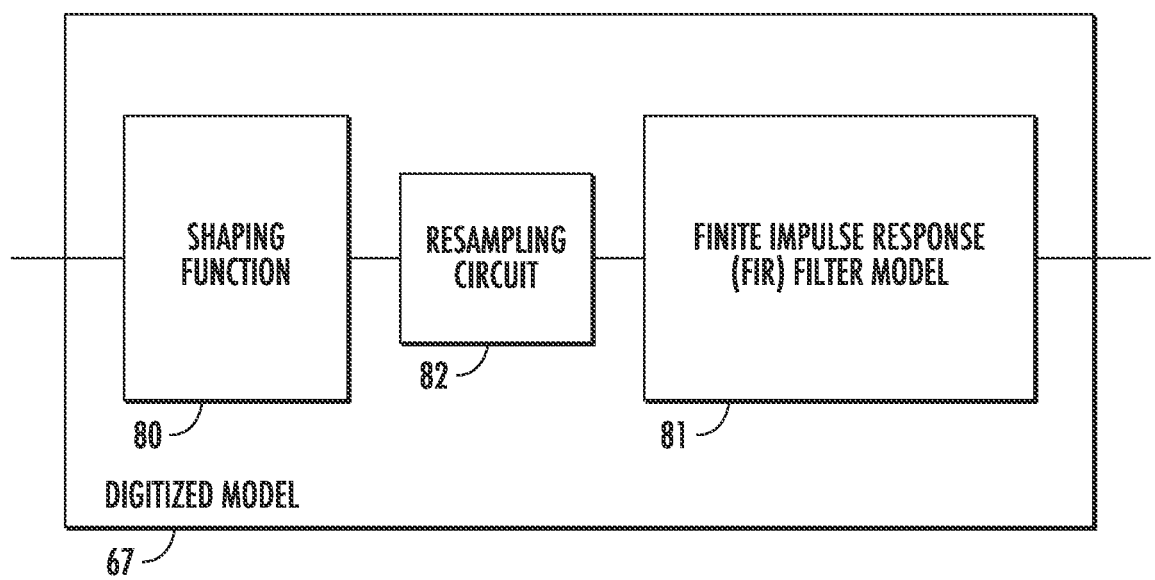
FIG. 5B shows the digitized model of the attack detector circuit according to another embodiment.

In some embodiments, the shaping function 80 may be identical to the shaping function 77 of the transmit circuit 31. Thus, in this embodiment, the shaping function 80 may utilize an oversampling rate that is different from that of the receive circuit 32. Thus, in some embodiments, as shown in FIG. 5B, a resampling circuit 82 may be disposed between the shaping function 80 and the FIR filter model 81 which converts the incoming expected data from one oversample rate to a different oversample rate. In this embodiment, the upsample circuit 66 operates at the same sampling frequency as the upsampler 71 in the transmit circuit 31.

In another embodiment, the digitized model 67 may be a FIR filter model that emulates the function of all components in the transmit circuit 31 of the transmitting device through the differentiator 61 of the receiving device. In this embodiment, a separate shaping function 80 may be omitted.

As noted above, the attack metric calculator 68 compares data from the digitized model 67 with data that is based on the differentiated phase value generated in the receive circuit 32. This comparison may be done using a correlator, wherein the correlator multiplies both signals sample by sample, sums the products together and determines a score from this information. In some embodiments, this score is normalized such that 100% matches yields a normalized correlation score of 1.

Alternatively, the attack metric calculator 68 perform the comparison by using a cost function to determine a mean square error (MSE). In this embodiment, the attack metric calculator 68 may calculate a difference between each sample from the digitized model 67 and the fractional delay filter 64, square this difference and add this result to an accumulated total. Of course, other cost functions are also possible.

Figure 6:
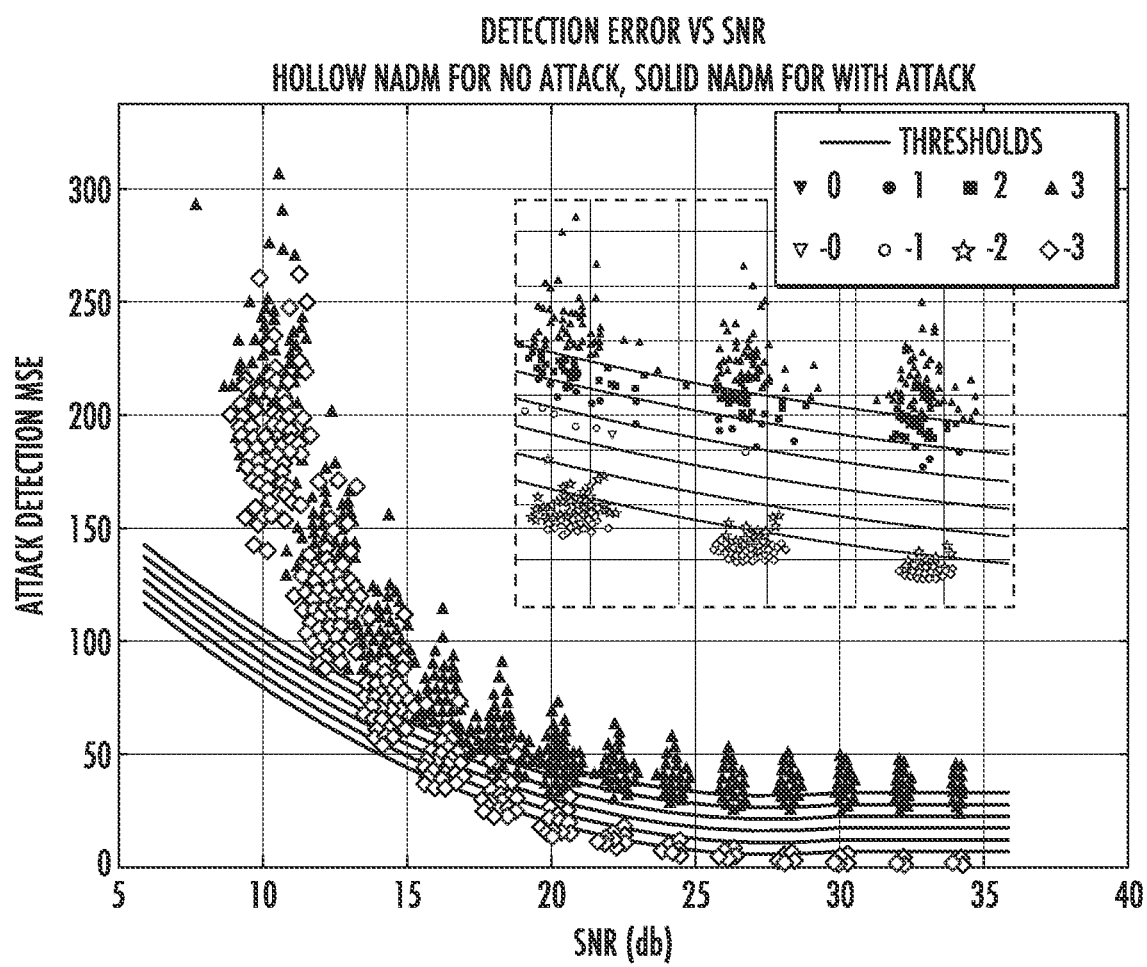
FIG. 6 shows a graph of threshold versus SNR used to determine the Normalized Detection Attack Metric.

In certain embodiments, a value known as the Normalized Attack Detection Metric (NADM) may be used to provide an indication of the likelihood of an attack. This value may be a 4 bit signed number, where positive numbers indicate that an attack is likely and negative numbers indicate that an attack is unlikely. The Attack Metric Calculator 68 may utilize the normalized correlation score or the MSE to determine this value. Thus, in some embodiments, the Attack Metric Calculator 68 may convert the normalized correlation score or the MSE into the NADM. For example, empirical testing or simulations may be performed at a plurality of different signal-to-noise (SNR) levels and different numbers of errors in the received data. Based on this testing and simulation, a graph, such as that shown in FIG. 6 can be created. In this graph, the threshold levels that separate the NADM values of −3 to 3 are shown. Note that these threshold levels may be a function of SNR, as a number of errors at a high SNR may be more indicative of an attack than the same number of errors at a lower SNR. Thus, in some embodiments, the receive circuit 32 estimates the SNR. In one embodiment, this is done by using the Received Signal Strength Indicator (RSSI). For example, a noise level may be calculated. The difference between the RSSI and the noise level may be used as the SNR.

In operation, the processing unit 20 determines that it is receiving a HADM packet from another device, such as a transmitting device. In response, the receive circuit 32 operates as normal, creating the differentiated phase signal. In addition, the timing circuit and frequency offset detector 62 also provides an indication of the synchronization pattern, referred to as SYNC INDEX. This SYNC INDEX signal may be used to align the data entering the attack Detector circuit 65 with the data from the receive circuit 32. The processing unit 20 also enables the Attack Detector circuit 65 so that the data representative of that being transmitted is provided to the Attack Detector circuit 65. In addition, the timing circuit and frequency offset detector 62 also provides an indication of the synchronization pattern, referred to as SYNC INDEX. This SYNC INDEX signal may be used to align the data entering the Attached Detector circuit 65 with the data from the receive circuit 32. After the packet has been completely received, the Attack Metric Calculator 68 calculates a score, which may be a normalized correlation score or a MSE. Based on this score, the processing unit 20 can determine the appropriate NADM for this packet. Upper layers of the software may determine how best to utilize the NADM values. For example, in some embodiments, distance measurements that are made where the likelihood of an attack is high, may be discarded. Further, in certain embodiments, the NADM value is also transmitted to the other network device (either the initiator or reflector) that participated in the distance measurement.

While the above description discloses a system where the digitized model produces an output that is compared to the differentiated phase, other embodiments are also possible. For example, in another embodiment, the phase produced by the CORDIC 60 (or other phase calculator) is compared to the output of the digitized model 67. In other words, in some embodiments, the digitized model 67 produces an expected phase signal rather than an expected differentiated phase signal.

Thus, in many embodiments, the digitized model 67 emulates the components of the receive circuit 32 up to the phase calculator or CORDIC 60. In some embodiments, the digitized model 67 also emulates the functionality of the differentiator 61. Thus, in all of these embodiments, the receive circuit 32 generates a receive circuit output, which is either a plurality of phase values or a plurality of differentiated phase values. The digitized model 67 is used to produce a signal that is representative of the receive circuit output.

As noted above, there are two different signal sequences; Sounding Sequence and Random Bit Sequence. For the Random Bit Sequence (RBS), the entire payload is used to calculate the score. However, Sounding Sequence (SS) works differently since the payload is known to be a repeating pattern of 1010. Because it is a repeating pattern, an attacker knows the sequence to transmit. In this case, markers are introduced, the locations of which only the initiator and reflector known. A marker may be a sequence of 1100 or 0011. Thus, to detect an attack, only those regions near the markers are used to calculate the score. The remaining of the payload is ignored, since it is anticipated that the attacker would correctly anticipate the bits to transmit.

The present system has many advantages. First, this system utilized a digitized model of at least part of the receive circuit 32 and optionally part of the transmit circuit 31. This digitized model consumes much less real estate and power than an actual duplication of these components would require. Thus, this approach saves real estate and power.

Second, this system is very reliable and able to correctly detect Man in the Middle Attacks, even at low SNR levels. In some simulations, it was found that the embodiment of FIGS. 4A-4C and the embodiment of FIGS. 4A and 4D both correctly identify an attack more than 95% of the time, even when the SNR level was below 20 dB (about 18 dB).

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A wireless network device, comprising:
a processing unit;
a transmit circuit;
a receive circuit comprising:
an RF circuit to generate incoming data, wherein the RF circuit comprises front end components and a channel filter having a first bandwidth;
a phase calculator to generate a phase for each sample of the incoming data that was processed by the channel filter;
a second channel path, wherein the second channel path generates a second channel path output, wherein the second channel path output is a plurality of phase values or a plurality of differentiated phase values, the second channel path comprising:
a second channel filter, having a second bandwidth different from the first bandwidth, in communication with the front end components; and
a second phase calculator, to generate a phase for each sample output from the second channel filter to create the plurality of phase values;
a fractional delay filter to create a delayed second channel path output; and
an attack detector circuit, wherein the attack detector circuit comprises:
a digitized model of at least part of the second channel path operating at a same oversample rate as the receive circuit; and
an attack metric calculator, wherein the attack metric calculator compares an output of the digitized model with the second channel path output and computes a correlation score.

2. The wireless network device of claim 1, wherein the digitized model comprises a finite impulse response (FIR) filter model having a plurality of taps.

3. The wireless network device of claim 1, wherein the digitized model emulates an operation of the front end components, the second channel filter, and the second phase calculator.

4. The wireless network device of claim 1, wherein the second channel path further comprises a differentiator to generate the plurality of differentiated phase values from the plurality of phase values and wherein the second channel path output comprises the plurality of differentiated phase values and wherein the digitized model emulates an operation of the front end components, the second channel filter, the second phase calculator and the differentiator.

5. The wireless network device of claim 1, wherein the transmit circuit comprises a shaping function and a power amplifier; and
wherein the attack detector circuit comprises a second digitized model to emulate at least a portion of the transmit circuit, wherein an output of the second digitized model is used as an input to the digitized model.

6. The wireless network device of claim 5, wherein the second digitized model operates at a different oversample rate than the transmit circuit.

7. The wireless network device of claim 5, wherein the second digitized model operates at a same oversample rate as the transmit circuit, and the attack detector circuit comprises a resampling circuit disposed between the second digitized model and the digitized model.

8. The wireless network device of claim 1, wherein the transmit circuit comprises a shaping function and a power amplifier; and
wherein the digitized model emulates at least a portion of the transmit circuit.

9. The wireless network device of claim 1, wherein the correlation score is used to determine whether a distance measurement should be discarded.

10. A wireless network device, comprising:
a processing unit;
a transmit circuit;
a receive circuit comprising:
an RF circuit to generate incoming data, wherein the RF circuit comprises front end components and a channel filter having a first bandwidth;
a phase calculator to generate a phase for each sample of the incoming data that was processed by the channel filter; and
a second channel path, wherein the second channel path generates a second channel path output, wherein the second channel path output is a plurality of phase values or a plurality of differentiated phase values, the second channel path comprising:
a second channel filter, having a second bandwidth different from the first bandwidth, in communication with the front end components; and
a second phase calculator, to generate a phase for each sample output from the second channel filter to create the plurality of phase values; and
an attack detector circuit, wherein the attack detector circuit comprises:
a digitized model of at least part of the second channel path, wherein the digitized model operates using a higher oversample rate than the second channel path; and
an attack metric calculator, wherein the attack metric calculator compares an output of the digitized model with the second channel path output and computes a correlation score.

11. The wireless network device of claim 10, wherein there are N samples from the digitized model for each output from the second channel path, and wherein the attack metric calculator compares each of the N samples to the second channel path output and generates N scores, wherein a score of the N scores having a best correlation is selected as the correlation score.

12. The wireless network device of claim 10, wherein the digitized model comprises a finite impulse response (FIR) filter model having a plurality of taps.

13. The wireless network device of claim 10, wherein the digitized model emulates an operation of the front end components, the second channel filter, and the phase calculator.

14. The wireless network device of claim 10, wherein the second channel path further comprises a differentiator to generate the plurality of differentiated phase values from the plurality of phase values and wherein the second channel path output comprises the plurality of differentiated phase values and wherein the digitized model emulates an operation of the front end components, the second channel filter, the phase calculator and the differentiator.

15. The wireless network device of claim 10, wherein the transmit circuit comprises a shaping function and a power amplifier; and wherein the attack detector circuit comprises a second digitized model to emulate at least a portion of the transmit circuit, wherein an output of the second digitized model is used as an input to the digitized model.

16. The wireless network device of claim 15, wherein the second digitized model operates at a different oversample rate than the transmit circuit.

17. The wireless network device of claim 15, wherein the second digitized model operates at a same oversample rate as the transmit circuit, and the attack detector circuit comprises a resampling circuit disposed between the second digitized model and the digitized model.

18. The wireless network device of claim 10, wherein the transmit circuit comprises a shaping function and a power amplifier; and wherein the digitized model emulates at least a portion of the transmit circuit.

19. The wireless network device of claim 10, wherein the correlation score is used to determine whether a distance measurement should be discarded.

\* \* \* \* \*